United States Patent
Bender et al.

(10) Patent No.: US 10,397,166 B2
(45) Date of Patent: Aug. 27, 2019

(54) SAVING COMMUNICATION CONTENT TO A SOCIAL NETWORK ENVIRONMENT

(71) Applicant: International Business Machines Corporation, Armonk, NY (US)

(72) Inventors: Michael Bender, Rye Brook, NY (US); Gordan G. Greenlee, Endicott, NY (US); David E. Nachman, Morristown, NJ (US); Michael P. Shute, New Rochelle, NY (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 14/590,462

(22) Filed: Jan. 6, 2015

(65) Prior Publication Data

US 2016/0197871 A1    Jul. 7, 2016

(51) Int. Cl.
H04L 12/58         (2006.01)

(52) U.S. Cl.
CPC .............. *H04L 51/32* (2013.01); *H04L 51/16* (2013.01)

(58) Field of Classification Search
None
See application file for complete search history.

(56) References Cited

U.S. PATENT DOCUMENTS

| | | | |
|---|---|---|---|
| 7,856,469 B2 | 12/2010 | Chen et al. | |
| 2007/0133437 A1* | 6/2007 | Wengrovitz | H04M 3/56 370/260 |
| 2008/0109406 A1* | 5/2008 | Krishnasamy | G06Q 10/107 |
| 2008/0141146 A1 | 6/2008 | Jones et al. | |
| 2008/0250336 A1 | 10/2008 | Gusler et al. | |
| 2009/0049138 A1* | 2/2009 | Jones | G06Q 10/107 709/206 |
| 2009/0150397 A1* | 6/2009 | Chen | G06F 17/30876 |
| 2009/0172150 A1* | 7/2009 | Alkov | G06F 17/30873 709/224 |
| 2010/0296641 A1 | 11/2010 | Goel et al. | |
| 2012/0136939 A1* | 5/2012 | Stern | G06Q 10/107 709/206 |
| 2016/0142358 A1* | 5/2016 | Zunger | G06Q 50/01 709/206 |

* cited by examiner

*Primary Examiner* — Jason D Recek
*Assistant Examiner* — Lesa M Kennedy
(74) *Attorney, Agent, or Firm* — Maeve M. Carpenter; Hunter E. Webb; Keohane & D'Alessandro PLLC (57) ABSTRACT

In general, embodiments of the invention provide an approach for saving communication content to a social network for later recall. Specifically, communication data is received from multiple input data streams. The communication data is scanned and tags are generated from the most frequent, non-excluded words. The communication data, along with the tags, are saved to the social network in a single output stream.

20 Claims, 4 Drawing Sheets

SAVING COMMUNICATION CONTENT TO A SOCIAL NETWORK ENVIRONMENT

TECHNICAL FIELD

The present invention relates to saving communication content to a social network environment. Specifically, the present invention relates to a method and system for saving communication content to one or more social network locations, enabling future recall of the communication content by social contacts provided with access to the communication content.

BACKGROUND

As it is generally known, in computer-based communication, instant messaging systems enable instant communication between two or more people over a communication network. In many organizations today, there exists an entrenched culture of instant messaging and audio communication (e.g., voice communication via phones) between coworkers. This provides significant value in terms of collaboration between individuals or groups. Social networks are also emerging as invaluable tools for collaboration. Social networks typically operate with several different channels, including wikis, forums, blogs, and the like. Social networks also provide a more durable record of interactions between people, whereas instant messaging requires the participants to save the chats within their client programs.

Oftentimes, there is an instant messaging exchange between individuals or groups that would be beneficial to a larger group or should be maintained to allow for future reference. There is no easy or uniform mechanism to persist (or save) information between these two systems of interactions. Still, other times, audio is the preferred method of communication, but the content also is not saved. When audio is the communication method, it is frequently used in combination with a textual interface as described above. Today's mechanisms do not provide a way to bridge the gap between instant messaging and audio communication with social networks.

SUMMARY

In general, embodiments of the invention provide an approach for saving communication content to a social network for later recall. Specifically, communication data is received from multiple input data streams. The communication data is scanned and tags are generated from the most frequent, non-excluded words. The communication data, along with the tags, are saved to the social network in a single output stream.

One aspect of the present invention includes a method for saving communication content to a social network, comprising the computer-implemented steps of: receiving communication data from one or more input source streams, wherein the communication data includes a temporal sequence of communications between at least two participants; generating one or more tags based on the communication data; and saving communication content to the social network, wherein the communication content is derived from the communication data and the one or more tags.

A second aspect of the present invention provides a system for saving communication content to a social network, comprising: a memory medium comprising program instructions; a bus coupled to the memory medium; and a processor, for executing the program instructions, coupled to the memory medium that when executing the program instructions causes the system to: receive communication data from one or more input source streams, wherein the communication data includes a temporal sequence of communications between at least two participants; generate one or more tags based on the communication data; and save communication content to the social network, wherein the communication content is derived from the communication data and the one or more tags.

A third aspect of the present invention provides a computer program product for saving communication content to a social network, the computer program product comprising: a computer readable storage device, and program instructions stored on the computer readable storage media, to: receive communication data from one or more input source streams, wherein the communication data includes a temporal sequence of communications between at least two participants; generate one or more tags based on the communication data; and save communication content to the social network, wherein the communication content is derived from the communication data and the one or more tags.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the embodiments set forth herein. Rather, these illustrative embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise.

Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Furthermore, the term "developer" refers to any person who writes computer software. The term can refer to a specialist in one area of computer programming or to a generalist who writes code for many kinds of software.

As indicated above, embodiments of the invention provide an approach for saving communication content to a social network for later recall. Specifically, communication data is received from multiple input data streams. The communication data is scanned and tags are generated from the most frequent, non-excluded words. The communication data, along with the tags, are saved to the social network in a single output stream.

Figure 1:
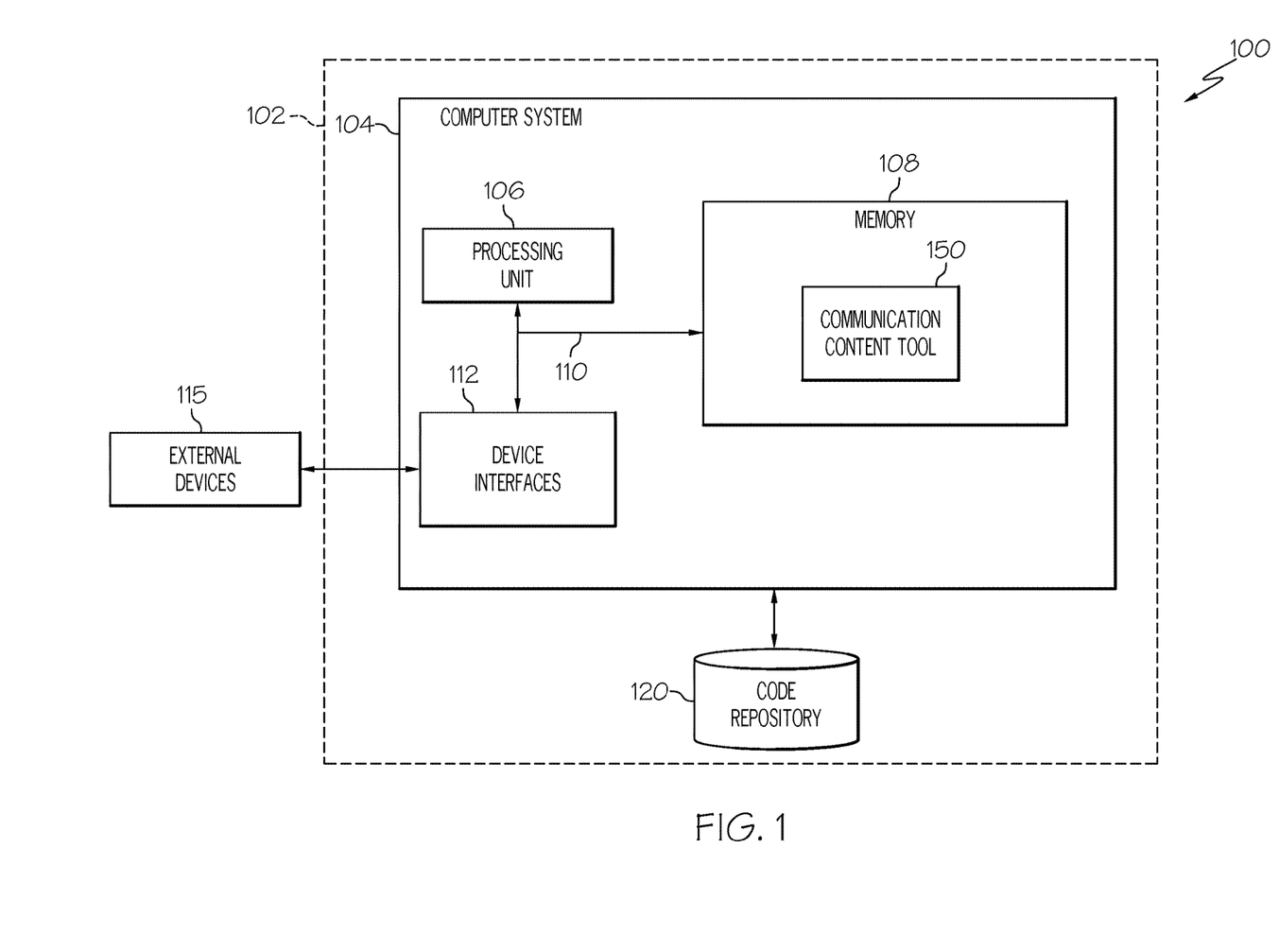
FIG. 1 depicts a computerized implementation according to an embodiment of the present invention.

FIG. 1 depicts a computerized implementation 100 according to an embodiment of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communication occurs via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for providing a passport according to the present invention. It should be understood that any other computers implemented under the present invention may have different components/software, but will perform similar functions. As shown, computer system 104 includes a processing unit 106, memory 108 for storing a communication content tool 150, a bus 110, and device interfaces 112.

Processing unit 106 collects and routes signals representing outputs from external devices 115 (e.g., a keyboard, a pointing device, a display, a graphical user interface, etc.) to communication content tool 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG).)

In general, processing unit 106 executes computer program code, such as program code for operating communication content tool 150, which is stored in memory 108 and/or code repository 120. While executing computer program code, processing unit 106 can read and/or write data to/from memory 108, and code repository 120. Code repository 120 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

The work environment is changing rapidly, but how those changes affect employee performance and productivity is not well understood. One notable finding is that the nature of collaboration has changed. Many jobs require more collaboration today than they did even a few years ago. Collaboration has an outsized impact on team performance. Levels of knowledge sharing have a significant impact on work-unit performance. As collaboration takes on a larger role in employees' daily work, companies seek ways to capture the critical knowledge and expertise workers possess, along with any ideas shared or decisions made during collaboration sessions.

In recent years, social networks have gained in popularity among Internet users. Social networks enable users to hold representative accounts (or profiles), and designate connections to other account holders, which may include friends, family members, or co-workers on the same social network. These connections determine a user's social graph, which defines the user and the others with whom the user is connected on the social network. Users can conduct a variety of activities based on their social graph, including sharing information and media with others, receiving updates from others, commenting on posted information, playing games, chatting, endorsing electronic information items such as websites or others' posts, etc.

As described herein, the present invention provides a methodology for saving a communication content output file derived from communication content sets received from one or more input source streams (e.g., instant messaging chat session, telephone conference call, video conference call, web chat, etc.) to a social network. The methodology may include setting up profiles for common repositories with the appropriate identifiers and/or passwords needed to store the meeting content or business information. The communication content may be "tagged" based on frequency of words used. Additionally, a predefined list of words (e.g., words such as "the", "and", "but", etc.) may be excluded from the tagging process.

The advantage of this information would be the ease of documenting business communication versus a highly manual process that is required today and often lost. The creation of the communication content output file could be time stamped in a non-editable format (e.g., a PDF file) so that the information becomes a trusted source. For example, the trusted information may represent the minutes from a business meeting. The information may be more easily located due to the tagging capabilities and other inherent capabilities available in the social world. The information may also be available to a larger audience than standard meeting minutes, which are traditionally limited to the participants or key stakeholders.

Three example scenarios are provided below in order to illustrate how embodiments of the present invention may be used to save communication content to a social network environment. In the first example scenario, a software development team and a customer group meet using an instant meeting utility or application to discuss customer requirement changes. During the chat session, one of the customers types the requirement changes that are needed in the chat session and the two groups come to an agreement on the changes.

Upon ending the chat session, the communication content may be saved to one or more social network locations for enabling recall of the content in the future by social contacts provided with access to the communication content. Users may be provided with access based on user credentials. Credentials are often used for authentication of users. Credentials refer to various inputs from/of (specific to) the user, which are processed for authenticating users. Examples of credentials include user identifier (e.g., login name, email identifier), password, image (of face, thumb-print, etc.), voice, content of an electronic file (e.g., representing a digital certificate), etc. An authentication server may collect the desired credentials, as suited for corresponding situations, from a user and authenticate the user based on the received credentials.

In the example scenario set forth above, the requirements may be saved into a team collaboration application. This not only documents the changes, but also includes the concurrence of the two groups on the agreed upon terms. In other examples, the chat content may be saved in other forms in social environment for future recall. For example, in a meeting discussing architectural concerns, key business agreements and requirements as they are understood in the meeting are captured as the attendees articulated them in the meeting. The agreements and requirements may be stored as part of a project control book (PCB) or memorandum of understanding (MoU). The process flow discussed above will now be described in greater detail with reference to FIG. 2.

Figure 2:
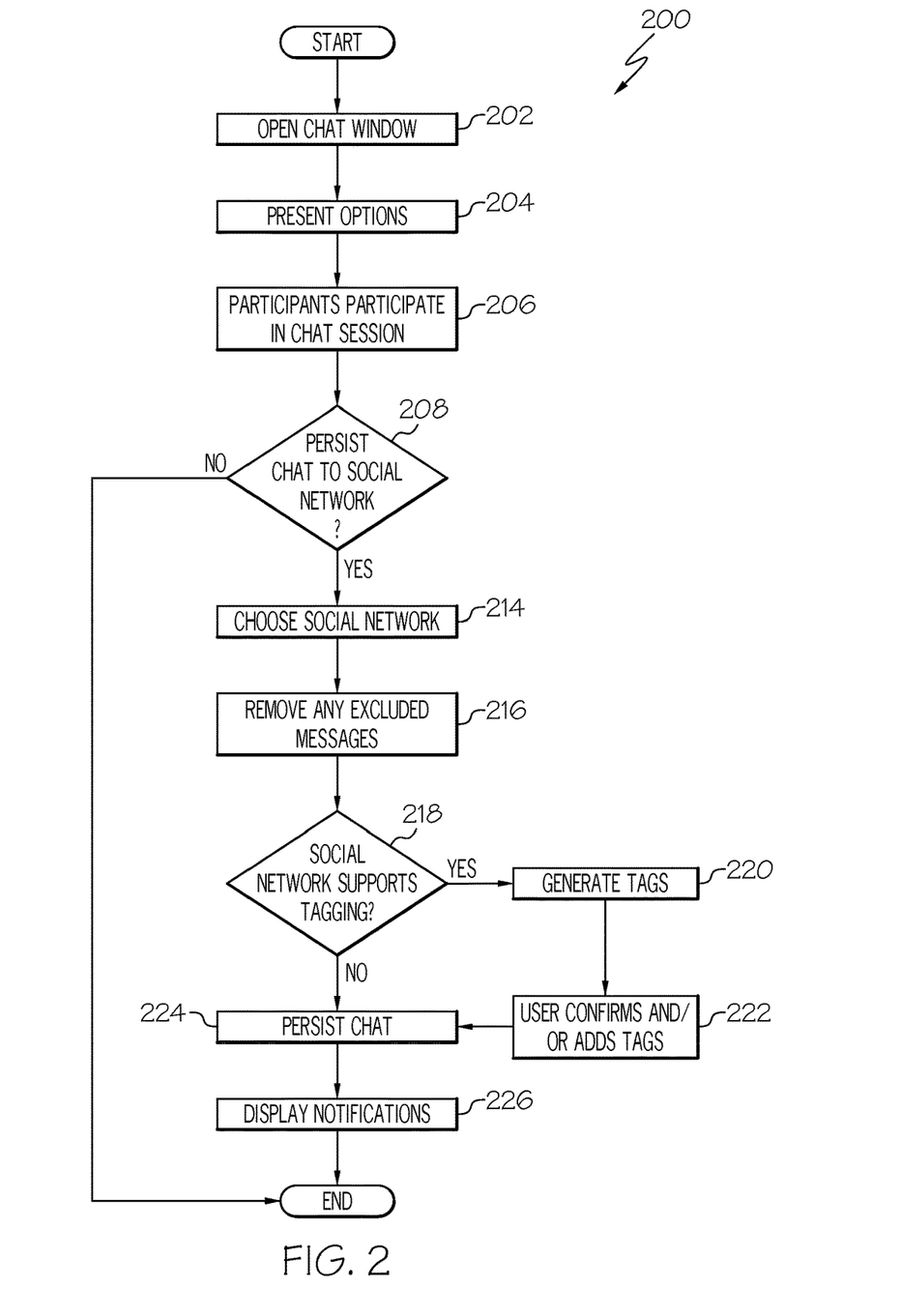
FIG. 2 depicts a method flow diagram for saving chat content to a social network according to an embodiment of the present invention.

FIG. 2 depicts a method flow diagram 200 for saving chat content to a social network according to an embodiment of the present invention. Instant messaging is defined as the exchange of content between a set of participants in near real time. A user opens an instant messaging chat window at 202. At 204, options are presented to the user. In one example, the user may have the option to save chat content to a social software application. In addition, each participant in the chat session may be able to toggle all or some of the participant's messages from being saved. In one embodiment, a restriction may exist of requiring an entry of a username as a logon identifier and then requiring an entry of a password associated with the username to obtain permission for saving the chat content to the social network.

The participants participate in the chat session by communicating with each other via the transmission of text messages from sender to receiver(s) at 206. At the conclusion of the chat session, a determination is made whether to persist a transcript representing the chat content to the social network at 208. The decision to persist may be determined based on the option chosen at step 204. If the chat content is to be persisted, the user chooses a social network profile to save the chat content to at 214. At 216, all excluded messages are removed from the chat content to be saved. At 218, a determination is made whether the social network supports tagging. If so, at 220, the remaining messages in the chat content are scanned and tags are generated from the most frequent, non-excluded words used in the chat content. At 222, the user confirms the tags. In addition or alternatively, the user may add (additional) tags manually. At 224, the chat content is persisted to the social network. If the social network supports tagging, any tags related to the chat content are also persisted to the social network. At 226, a notification is displayed to all parties that the chat content was persisted to the social network.

In a second example scenario, a software development team on a conference call holds a scrum meeting, and all of the participating parties state what they will be doing for the next day. At the conclusion of the scrum meeting, the audio file is saved and transcribed to text so that the words of each person (based on call-in number) are saved in the meeting minutes. The scrum master saves these meeting minutes in a collaboration network location for future recall. The process flow discussed above will now be described in greater detail with reference to FIG. 3.

Figure 3:
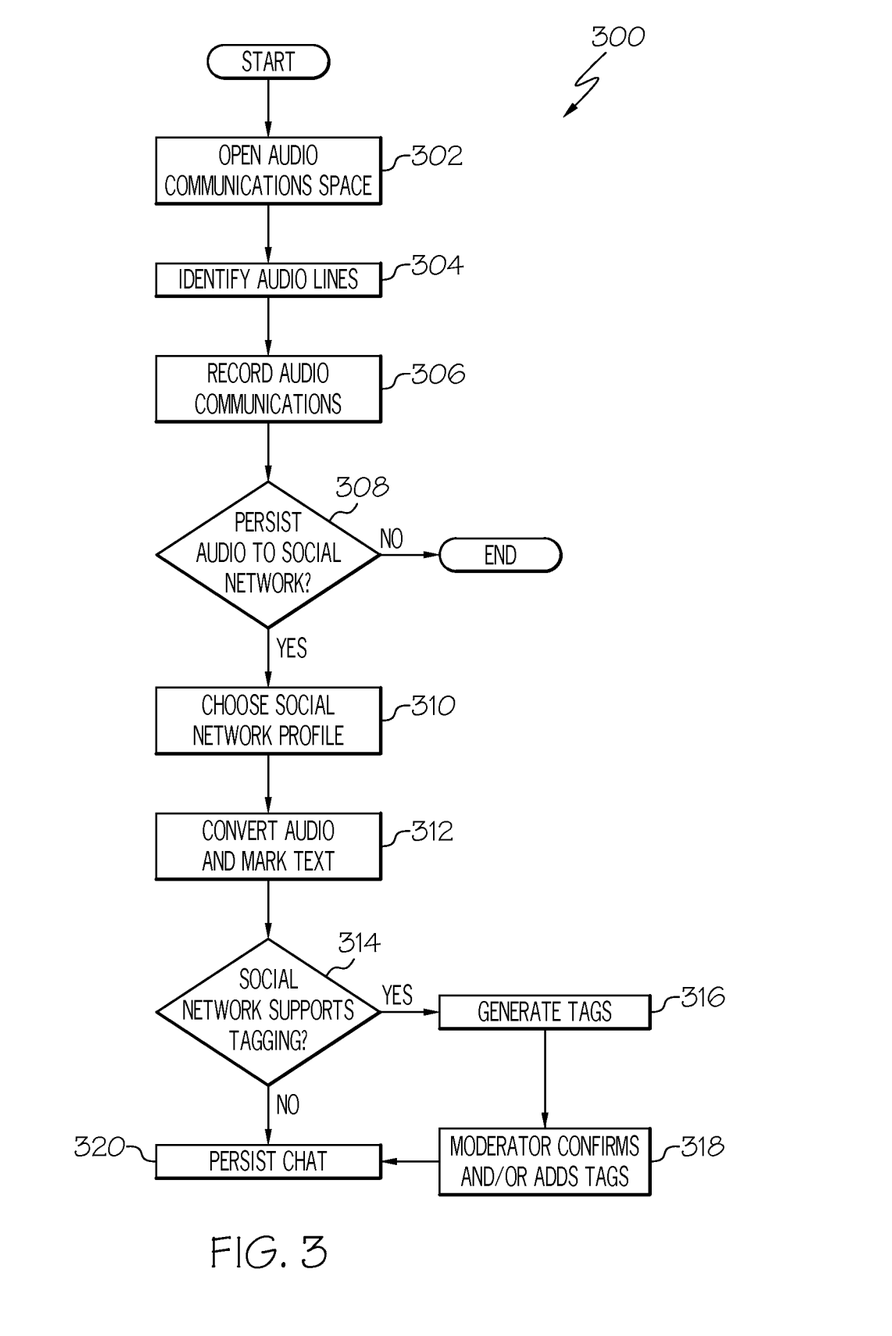
FIG. 3 depicts a method flow diagram for saving audio communications content to a social network according to an embodiment of the present invention.

FIG. 3 depicts a method flow diagram 300 for saving audio communications content to a social network according to an embodiment of the present invention. At 302, a moderator opens an audio communications space. The space may include a conference call, web conference, or the like. At 304, participants join the space and each participant providing audio is identified. Each participant may be identified by phone number, web conference login, or the like, based upon the type of audio communications space being utilized. The moderator begins recording audio communications at 306. At 308, a determination is made whether to persist the audio communications content to a social network. If the audio communications content is to be persisted, the moderator chooses a social network profile to save the audio communications content to at 310.

At 312, the audio communications (e.g., voices of persons participating in a conference call) is converted to text (i.e., a transcript is generated). The speech may be transcribed by means known in the art. The text may be annotated or marked with the identity of the speech originator where possible (e.g., based on phone number, web conference login, etc.) to identify the contributions of each participant. The text may also be time stamped. At 314, a determination is made whether the social network supports tagging. If so, at 316, the text is scanned and tags are generated from the most frequent, non-excluded words.

At 318, the moderator confirms the tags. In addition or alternatively, the moderator may add new tags and/or modify any existing tags manually. At 320, the text representing the audio communications content is persisted to the social network. If the social network supports tagging, any tags may be persisted to the social network along with the text. In one example, the audio file (or sound file) may also be persisted to the social network.

In a third example scenario, a computer production problem exists in a company and an instant messaging chat session is initiated to discuss the problem. As more people are brought into the chat session, a decision is made to start a conference call. Upon ending the conference call, the contents of the chat session and the contents of the conference call are merged into a single output stream of communication content and placed in time sequence to account for multiple communication types occurring at the same time. The contents may be stored in a collaboration network location for future recall. The process flow discussed above will now be described in greater detail with reference to FIG. 4.

Figure 4:
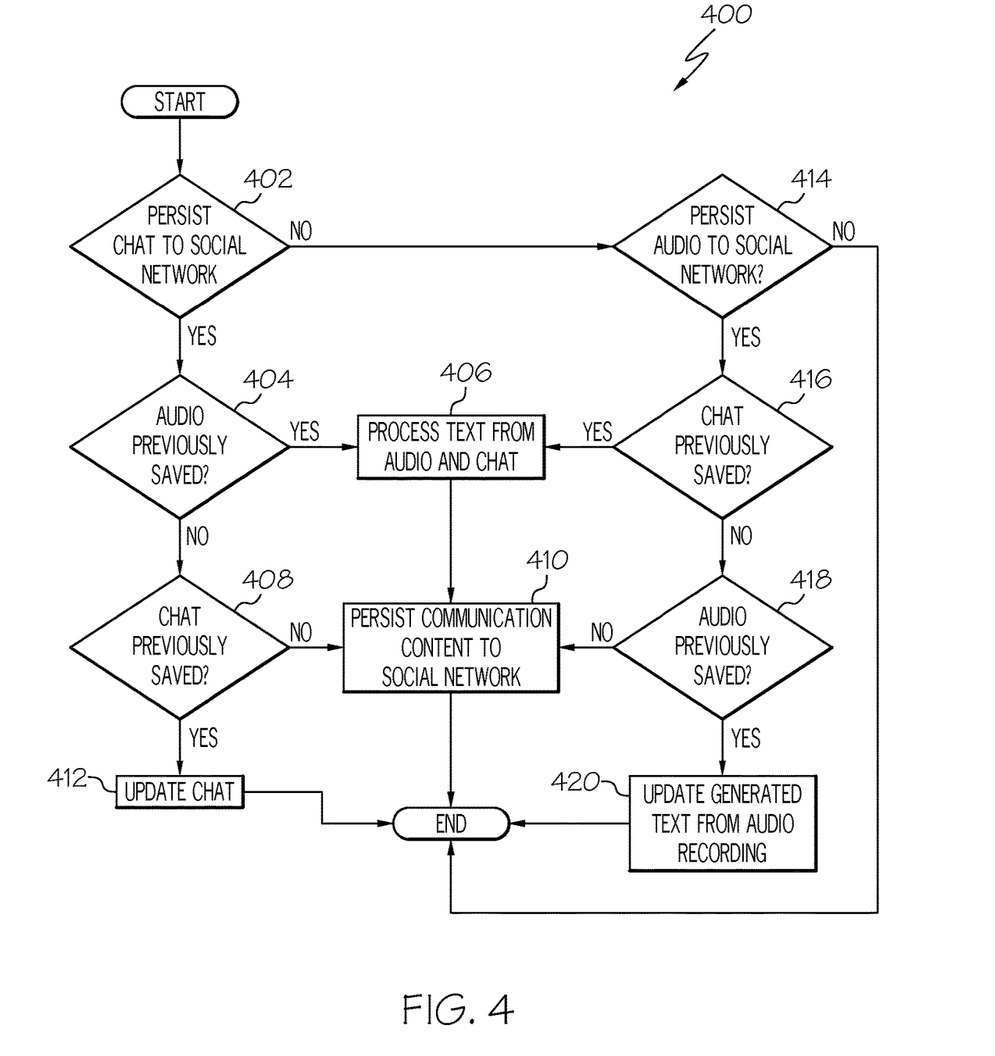
FIG. 4 depicts a method flow diagram for saving communication content from multiple data streams into a single output stream to a social network according to an embodiment of the present invention.

FIG. 4 depicts a method flow diagram 400 for saving communication content from multiple data streams (or sources) into a single output stream to a social network according to an embodiment of the present invention. At 402, a determination is made whether to persist chat content to a social network. The source of each piece of information received is identified. If the chat content is persisted, a determination is made whether audio content was received and saved prior to the receipt of the chat content at 404. If so, the chat content and audio content are processed at 406. To that end, the audio content is first converted to text. Next, the chat content and text are merged into a single output stream of communication content based on timestamps. At 408, a determination is made whether any chat content was previously saved. If not, at 410, the communication content including the merged chat content and text are persisted to a social network. If any chat content was previously received, the newly received chat content saved to the social network is updated at 412.

At 414, a determination is made whether to persist audio content to a social network. The source of each piece of information received is identified. If the audio content is persisted, a determination is made whether chat content was received and saved prior to the receipt of the audio content at 416. As previously described, the chat content and audio content are processed at 406. The audio content is converted to text and the chat content and text are merged into a single output stream of communication content based on timestamps producing a temporal sequence of communication between the participants. At 418, a determination is made whether any text related to audio content was previously saved. If not, at 410, the communication content including the merged chat content and text are persisted to the social network. If any audio content was previously received and processed, the text saved to the social network is updated at 420 to include the newly generated text.

It will be appreciated that the method process flow diagrams of FIGS. 2-4 represent possible implementations of process flows for saving communication content to a social network, and that other process flows are possible within the scope of the invention. The method process flow diagrams discussed above illustrate the architecture, functionality, and operation of possible implementations of systems, methods and computer program products according to various embodiments of the present invention. In this regard, each portion of each flowchart may represent a module, segment, or portion of code, which comprises one or more executable instructions for implementing the specified logical function(s). It will also be noted that each block of each flowchart illustration can be implemented by special purpose hardware-based systems that perform the specified functions or acts.

Further, it can be appreciated that the approaches disclosed herein can be used within a computer system for saving communication content to a social network. In this case, as shown in FIG. 1, communication content tool 150 can be provided, and one or more systems for performing the processes described in the invention can be obtained and deployed to computer infrastructure 102 (FIG. 1). To this extent, the deployment can comprise one or more of: (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 104 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 104 may be practiced in distributed computing environments where tasks are performed by remote processing devices that are linked through a communication network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, communication content tool 150 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided with this invention an approach for saving communication content to a social network. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for making individual communication content accessible to an organizational community, comprising the computer-implemented steps of:
  receiving, over a network, communication data from a plurality of input source streams in a chat session, wherein the communication data includes a temporal sequence of communications between at least two participants;

removing from a text-based content of the communication data an excluded message based on a designation from a participant of the at least two participants;

automatically generating one or more tags based on the text-based content of the communication data based on frequency of words used after excluding a predefined list of words and automatically tagging individual elements within the text-based content with the one or more tags that enable searching of the individual elements;

automatically saving, in response to a conclusion of the chat session, communication content from the chat session with the one or more automatically generated tags persisted therein directly to a social network profile in a social network of the organizational community, the social network being unrelated to the plurality of input source streams, wherein the communication content is derived from the communication data and includes a copy of an entirety of the text-based content that has not been excluded that is tagged with the one or more tags; and transforming the communication content in the social network to a trusted source by time stamping the communication content in a non-editable format.

2. The method of claim 1, wherein the communication data from a first input source stream includes one or more text messages from an instant messaging chat session.

3. The method of claim 2, wherein the communication data from a second input source stream includes spoken audio.

4. The method of claim 3, further comprising:
generating an audio transcription having the text-based content of the spoken audio;
annotating the audio transcription with identifying information for each participant within the spoken audio to form a corresponding annotated audio transcription, wherein the identifying information for at least one participant identifies the at least one participant based on a telephone number used by the at least one participant to join a conference call; and
generating one or more audio transcription tags based on the annotated audio transcription.

5. The method of claim 4, wherein the communication content is further derived from the annotated audio transcription and the one or more audio transcription tags.

6. The method of claim 5, further comprising:
determining a timestamp associated with each text message within the instant messaging chat session;
determining a set of timestamps indicating temporal positions of speech in the spoken audio; and
generating a temporal sequence associated with the communication data by merging the one or more text messages and the audio transcription using the determined timestamps.

7. The method of claim 6, further comprising:
saving a subset of the communication content to a second social network,
wherein the communication content is further derived using the generated temporal sequence.

8. A system for making individual communication content accessible to an organizational community, comprising:
a memory medium comprising program instructions;
a bus coupled to the memory medium; and
a processor, for executing the program instructions, coupled to the memory medium that when executing the program instructions causes the system to:

receive communication data from a plurality of input source streams in a chat session, wherein the communication data includes a temporal sequence of communications between at least two participants;

remove from a text-based content of the communication data an excluded message based on a designation from a participant of the at least two participants;

automatically generate one or more tags based on the text-based content of the communication data based on frequency of words used after excluding a predefined list of words and automatically tag individual elements within the text-based content with the one or more tags that enable searching of the individual elements;

automatically save, in response to a conclusion of the chat session, communication content from the chat session with the one or more automatically generated tags persisted therein directly to a social network profile in a social network of the organizational community, the social network being unrelated to the plurality of input source streams, wherein the communication content is derived from the communication data and includes a copy of an entirety of the text-based content that has not been excluded that is tagged with the one or more tags; and transform the communication content in the social network to a trusted source by time stamping the communication content in a non-editable format.

9. The system of claim 8, wherein the communication data from a first input source stream includes one or more text messages from an instant messaging chat session.

10. The system of claim 9, wherein the communication data from a second input source stream includes spoken audio.

11. The system of claim 10, the memory medium further comprising instructions to:
generate an audio transcription having the text-based content of the spoken audio;
annotate the audio transcription with identifying information for each participant within the spoken audio to form a corresponding annotated audio transcription, wherein the identifying information for at least one participant identifies the at least one participant based on a telephone number used by the at least one participant to join a conference call; and
generate one or more audio transcription tags based on the annotated audio transcription.

12. The system of claim 11, wherein the communication content is further derived from the annotated audio transcription and the one or more audio transcription tags.

13. The system of claim 12, the memory medium further comprising instructions to:
determine a timestamp associated with each text message within the instant messaging chat session;
determine a set of timestamps indicating temporal positions of speech in the spoken audio; and
generate a temporal sequence associated with the communication data by merging the one or more text messages and the audio transcription using the determined timestamps.

14. The system of claim 13, further comprising:
saving a subset of the communication content to a second social network,
wherein the communication content is further derived using the generated temporal sequence.

15. A computer program product for making individual communication content accessible to an organizational community, the computer program product comprising a computer readable storage device, and program instructions stored on the computer readable storage device, to:

receive communication data from a plurality of input source streams in a chat session, wherein the communication data includes a temporal sequence of communications between at least two participants;

remove from a text-based content of the communication data an excluded message based on a designation from a participant of the at least two participants;

automatically generate one or more tags based on the text-based content of the communication data based on frequency of words used after excluding a predefined list of words and automatically tag individual elements within the text-based content with the one or more tags that enable searching of the individual elements;

automatically save, in response to a conclusion of the chat session, communication content from the chat session with the one or more automatically generated tags persisted therein directly to a social network profile in a social network of the organizational community, the social network being unrelated to the plurality of input source streams, wherein the communication content is derived from the communication data and includes a copy of an entirety of the text-based content that has not been excluded that is tagged with the one or more tags; and     transform the communication content in the social network to a trusted source by time stamping the communication content in a non-editable format.

16. The computer program product of claim 15, wherein the communication data from a first input source stream includes one or more text messages from an instant messaging chat session.

17. The computer program product of claim 16, wherein the communication data from a second input source stream includes a spoken audio.

18. The computer program product of claim 17, further comprising program instructions stored on the computer readable storage device to:

generate an audio transcription having the text-based content of the spoken audio;

annotate the audio transcription with identifying information for each participant within the spoken audio to form a corresponding annotated audio transcription, wherein the identifying information for at least one participant identifies the at least one participant based on a telephone number used by the at least one participant to join a conference call; and     generate one or more audio transcription tags based on the annotated audio transcription.

19. The computer program product of claim 18, wherein the communication content is further derived from the annotated audio transcription and the one or more audio transcription tags.

20. The computer program product of claim 19, wherein the communication content is further derived using a temporal sequence, wherein the temporal sequence is generated using a first set of timestamps and a second set of timestamps, wherein the first set of timestamps are associated with each text message within the instant messaging chat session and the second set of timestamps are associated with one or more temporal positions of speech in the spoken audio.

\* \* \* \* \*